United States Patent
Michon et al.

(10) Patent No.: US 6,843,163 B2
(45) Date of Patent: Jan. 18, 2005

(54) BOOSTER USING A SEAL THAT ALSO SERVES TO SET THE POSITION

(75) Inventors: Jean-Pierre Michon, Saint Pathus (FR); Bruno Beylerian, Louvres (FR)

(73) Assignee: Robert Bosch GmbH, Stuttgart (DE)

( * ) Notice: Subject to any disclaimer, the term of this patent is extended or adjusted under 35 U.S.C. 154(b) by 75 days.

(21) Appl. No.: 10/425,849

(22) Filed: Apr. 29, 2003

(65) Prior Publication Data

US 2004/0012254 A1 Jan. 22, 2004

(30) Foreign Application Priority Data

May 7, 2002 (FR) .............................................. 02 05769

(51) Int. Cl.⁷ .............................................. F16J 15/18
(52) U.S. Cl. ...................................... 92/168; 91/376 R
(58) Field of Search ........................ 92/168; 91/376 R, 91/369.2

(56) References Cited

U.S. PATENT DOCUMENTS

| | | | | |
|---|---|---|---|---|
| 4,793,242 A | * | 12/1988 | Kobayashi | .................... 92/168 |
| 4,934,249 A | * | 6/1990 | Gautier et al. | ............ 91/376 R |
| 5,711,202 A | * | 1/1998 | Tsubouchi | ................ 91/376 R |
| 6,397,724 B1 | * | 6/2002 | Tsubouchi et al. | ........ 91/376 R |

* cited by examiner

*Primary Examiner*—Edward K. Look
*Assistant Examiner*—Michael Leslie
(74) *Attorney, Agent, or Firm*—Leo H McCormick, Jr.; Warren Comstock

(57) ABSTRACT

A pneumatic brake booster comprising a rigid casing (10) locally shaped into a hollow shaft (3), a hub (5) slideably mounted in an opening (30) of the hollow shaft (3), an annular seal (6) inserted between the hub (5) and the hollow shaft (3), and members designed to set the hub (5) in a rest position with respect to the hollow shaft (3). The seal (6) comprises an elastomeric material (61) shaped into an annulus and an annular metal insert (62), the position-setting members (71, 72) being partially formed by the insert (62).

6 Claims, 2 Drawing Sheets

BOOSTER USING A SEAL THAT ALSO SERVES TO SET THE POSITION

The present invention relates in general to hydraulic braking systems for motor vehicles equipped with pneumatic brake boosting.

BACKGROUND OF THE INVENTION

More specifically, the invention relates to a pneumatic brake booster comprising a rigid casing locally shaped into a hollow shaft pierced with an opening, a moving partition, a hub secured to the moving partition, an annular seal and position-setting means, the moving partition sealingly delimiting front and rear chambers of variable and complementing volumes inside the rigid casing, the hub being cylindrical and slideably mounted in the opening of the hollow shaft between a rest position and at least one active position, the seal being arranged between the hub and the hollow shaft, and the position-setting means fixing the rest position of the hub with respect to the casing.

Devices of this type are well known in the prior art as illustrated, for example, by patent documents U.S. Pat. No. 3,470,697, FR-2 532 084 and FR-2 658 466.

In spite of the relatively traditional nature of the technique concerned, boosters continue to be the subject of research aimed at further reducing the costs of manufacture without incurring any reduction in their reliability.

SUMMARY OF THE INVENTION

The present invention, which falls within this context, has the objective of proposing a booster that meets this need.

To this end, the booster according to the invention, in other respects in accordance with the generic definition given in the preamble hereinabove, is essentially characterized in that the seal comprises an elastomeric material shaped into an annulus and an annular metal insert, in that, in a region of radial narrowing of the insert, the elastomeric material is in sealed contact with the hollow shaft in a space radially external to the insert, and in sealed contact with the hub in a space radially internal to the insert, in that, in a region of radial widening of the insert, the insert is housed in the hollow shaft such that it can slide axially without radial clearance, and in that the position-setting means comprise a first pair of restraining surfaces, one of which consists of a first end of the insert and the other of which is formed on the hollow shaft, and a second pair of restraining surfaces one of which consists of a second end of the insert and the other of which is formed on the hub.

By virtue of such an arrangement, the seal can fulfil both its primary function of sealing between the hub and the hollow shaft and define the rest position that the hub adopts with respect to the casing.

In the preferred embodiment of the invention, the hollow shaft is at least partially cylindrical and the restraining surface of the first pair which is borne by the hollow shaft is defined by at least one lug formed by stamping in the hollow shaft.

The insert advantageously has a first fold via which it comes radially closer to the hollow shaft and an edge of which forms the first end of this insert.

The insert may also have a second fold via which it comes radially closer to the hollow shaft and which bears that one of the restraining surfaces of the second pair which consists of the second end of this insert.

It may be beneficial, depending on the diameter of the second fold of the insert, to make provision for the hollow shaft to have a radial widening in which this second fold is housed.

Finally, the hollow shaft may, opposite the region of radial narrowing of the insert, have an internal annular groove which delimits the space radially external to the insert, and in which the elastomeric material elastically engages, thus immobilizing the seal in terms of translation with respect to the hollow shaft.

Other features and advantages of the invention will become clearly apparent from the description thereof given hereafter by way of nonlimiting indication with reference to the attached drawings.

DETAILED DESCRIPTION OF THE INVENTION

Figure 1:
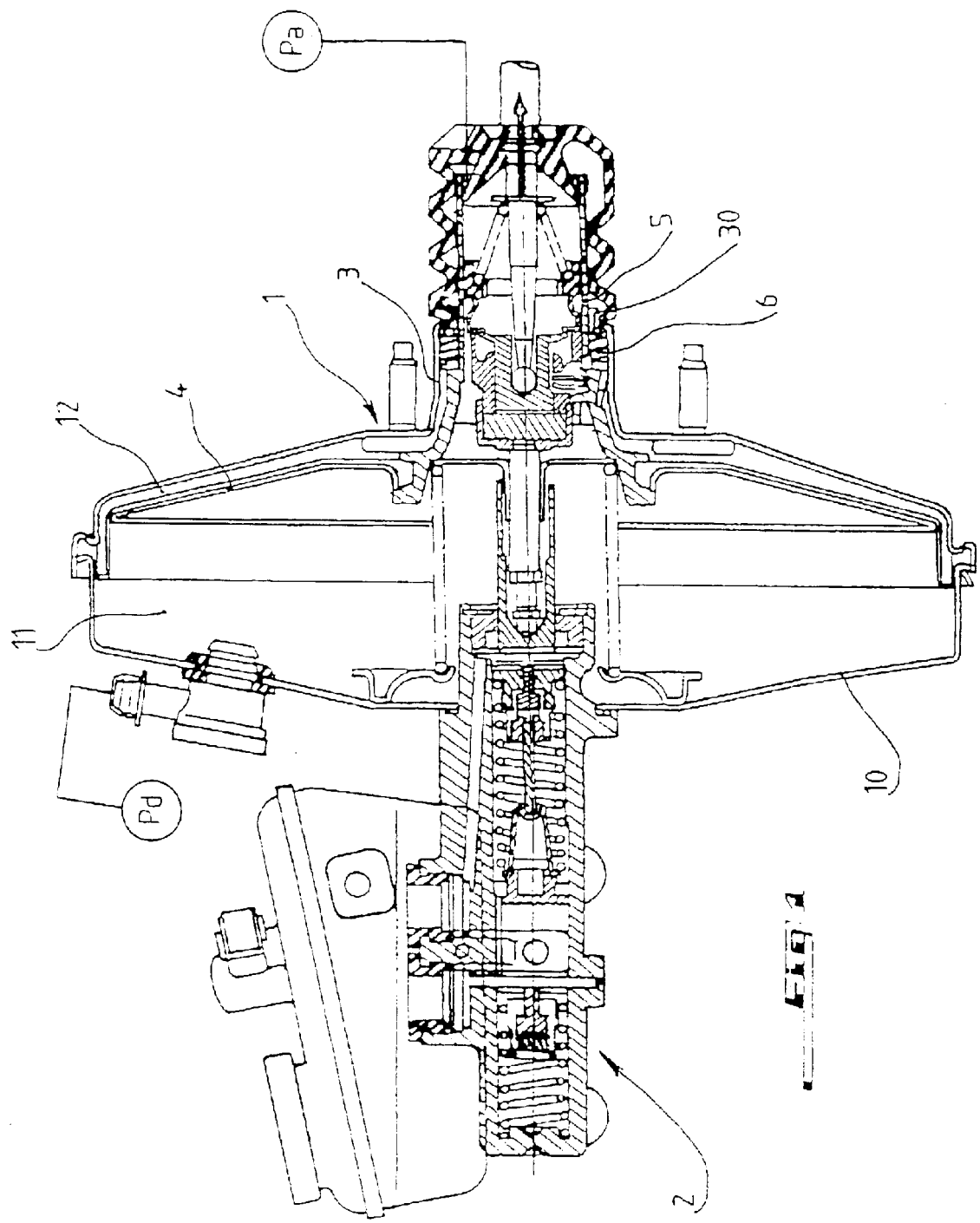
FIG. 1 is a view in longitudinal section of a known braking module comprising a booster and a master cylinder.

A pneumatic brake booster such as 1 (FIG. 1) is traditionally used to facilitate actuation of a master cylinder 2 to which it is coupled.

Such a booster comprises, in a way known per se, a rigid casing 10 locally shaped into a hollow shaft 3 pierced with an opening 30.

A moving partition 2 sealingly divides the inside of the rigid casing 10 and therein delimits a front chamber 11 and a rear chamber 12, these chambers having variable and complementing volumes.

In operation, the front chamber 11 is subjected to a relatively low first pressure Pd, to which the rear chamber 12 is also subjected when the booster is at rest.

When the booster is actuated, the rear chamber 12 on the other hand is subjected to a controlled pressure at a higher value, which may for example be as high as atmospheric pressure Pa, so that the difference in pressure between the front and rear chambers develops a brake-boosting force which is used to actuate the master cylinder 2.

The moving partition 4 is secured to a cylindrical hub 5 mounted to slide through the opening 30 of the hollow shaft 3, an annular seal 6 being arranged between the hub 5 and the hollow shaft 3. The hub 5, in the hollow shaft 3, adopts a rest position when the booster is at rest and moves into an active position when the booster is actuated, members being provided for setting the hub 5 in its rest position.

According to an essential feature of the invention, the seal 6 comprises an elastomeric material 61 shaped into an annulus and an annular metal insert 62, the position-setting members being partly formed by the insert 62.

More precisely (FIG. 2), the insert 62 has a region Zr of radial narrowing which delimits, on the one hand, a space radially external to the insert 62, in which space the elastomeric material 61 is in sealed contact with the hollow shaft 3 and, on the other hand, a space radially internal to the insert 62, in which space the elastomeric material 61 is in sealed contact with the hub 5.

The insert 62 also has a region Ze of radial widening, in which this insert is housed such that it can slide axially without radial clearance in the hollow shaft 3.

The means intended to set the hub 5 in the rest position, that is to say to precisely define the relative rest position of the hub 5 in the hollow shaft 3, comprise two pairs, 71 and 72, of restraining surfaces collaborating with each other.

The first pair 71 of restraining surfaces comprises a surface 711 consisting of the outermost end 621 of the insert 62, and a surface 712 formed on the hollow shaft 3.

The second pair 72 of restraining surfaces comprises a surface 71 consisting of the innermost end 622 of the insert 62, a surface 722 formed on the hub 5.

The restraining surface 712 belonging to the first pair 71 and borne by the hollow shaft 3 is, for example, defined by three lugs, such as 712, formed by stamping in the hollow shaft 3 and uniformly distributed around the internal periphery of the hollow shaft.

At its outermost end 621, the insert 62 may have a fold 623 via which it comes radially closer to the hollow shaft 3, and the edge 711 of which bears against the lugs 712.

At its innermost end 622, the insert 62 may have another fold 624 via which it moves radially closer to the hollow shaft 3 and which bears the restraining surface 721 of the second pair 72 exhibited by this insert 62.

Figure 2:
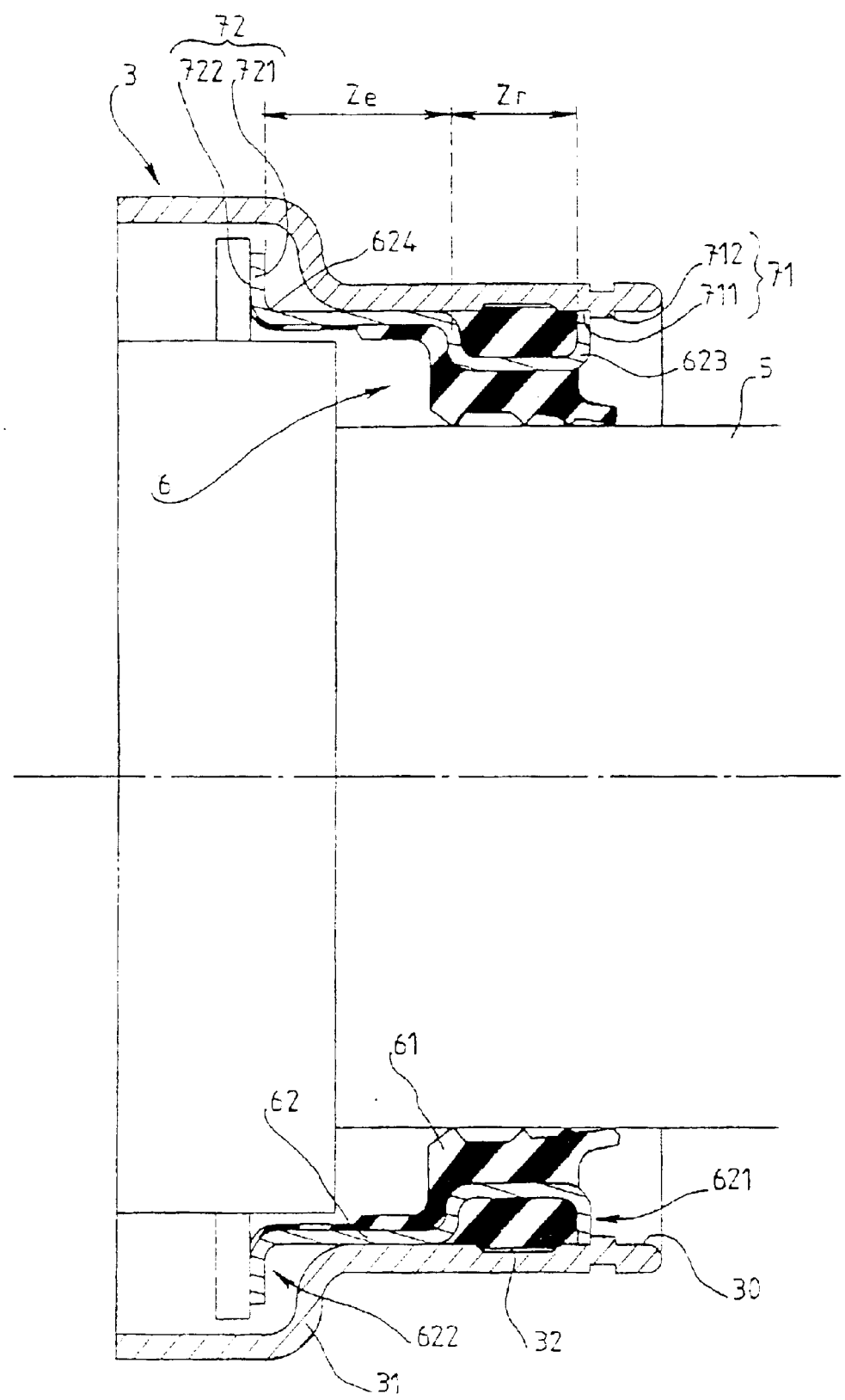
FIG. 2 is an enlarged partial view in longitudinal section of a booster according to the invention.

As shown in FIG. 2, the hollow shaft 3 may possibly have a radial widening 31 in which the second fold 624 of the insert 62 is housed.

To immobilize the seal 6 in terms of translation in the hollow shaft 3, it may be beneficial to form, in the hollow shaft 3, opposite the region Zr of radial narrowing of the insert 62, an internal annular groove 32 which delimits the space radially external to the insert, and into which the elastomeric material 61 elastically engages.

The restraining surface 722 borne by the hub 5 is, for example, formed by a face of a ring or a collection of studs, housed in the radial widening 31 of the hollow shaft 3.

Not only does the booster designed in the way described lead to a saving of material in that the seal 6 itself serves to define the rest position of the hub 5 in the hollow shaft, but it also leads to a simplification in its set-up in that the setting of the hub in the rest position merely entails choosing the location of the lugs 712 and in that the stamping operation during which these lugs are formed can be performed after the booster has been assembled and after its dimensions have been checked and taken into consideration.

We claim:

1. A pneumatic brake booster comprising a rigid casing (10) locally shaped into a hollow shaft (3) pierced with an opening (30), a moving partition (4), a hub (5) secured to the moving partition (4), an annular seal (6) and position-setting means (71, 72), the moving partition (4) sealingly delimiting front and rear chambers (11, 12) of variable and complementing volumes inside the rigid casing (10), the hub (5) being cylindrical and slideably mounted in the opening (30) of the hollow shaft (3) between a rest position and at least one active position, the seal (6) being arranged between the hub (5) and the hollow shaft (3), and the position-setting means (71, 72) fixing the rest position of the hub (5) with respect to the casing (10), characterized in that the seal (6) comprises an elastomeric material (61) shaped into an annulus and an annular metal insert (62), in that, in a region (Zr) of radial narrowing of the insert, the elastomeric material (61) is in sealed contact with the hollow shaft (3) in a space radially external to the insert (62), and in sealed contact with the hub (5) in a space radially internal to the insert (62), in that, in a region (Ze) of radial widening of the insert (62), the insert (62) is housed in the hollow shaft (3) such that it can slide axially without radial clearance, and in that the position-setting means (71, 72) comprise a first pair (71) of restraining surfaces (711, 712), one (711) of which consists of a first end (621) of the insert (62) and the other (712) of which is formed on the hollow shaft (3), and a second pair (72) of restraining surfaces (721, 722) one (721) of which consists of a second end (622) of the insert (62) and the other (722) of which is formed on the hub (5).

2. The pneumatic booster according to claim 1, characterized in that the hollow shaft (3) is at least partially cylindrical and in that the restraining surface (712) of the first pair (71) which is borne by the hollow shaft (3) is defined by at least one lug (712) formed by stamping in the hollow shaft (3).

3. The pneumatic booster according to claim 1, characterized in that the insert (62) has a first fold (623) via which it comes radially closer to the hollow shaft (3) and an edge (711) of which forms the first end (621) of this insert (62).

4. The pneumatic booster according to claim 1, characterized in that the insert (62) has a second fold (624) via which it comes radially closer to the hollow shaft (3) and which bears that one (721) of the restraining surfaces (721, 722) of the second pair (72) which consists of the second end (622) of this insert (62).

5. The pneumatic booster according to claim 4, characterized in that the hollow shaft (3) has a radial widening (31) in which the second fold (624) of the insert (62) is housed.

6. The pneumatic booster according to claims 1 characterized in that the hollow shaft (3), opposite the region (Zr) of radial narrowing of the insert (62), has an internal annular groove (32) which delimits the space radially external to the insert, and in which the elastomeric material (61) elastically engages, thus immobilizing the seal (6) in terms of translation with respect to the hollow shaft (3).

* * * * *